March 24, 1964     S. M. WALCUK     3,125,814
EDUCATIONAL DEVICE
Filed March 2, 1961
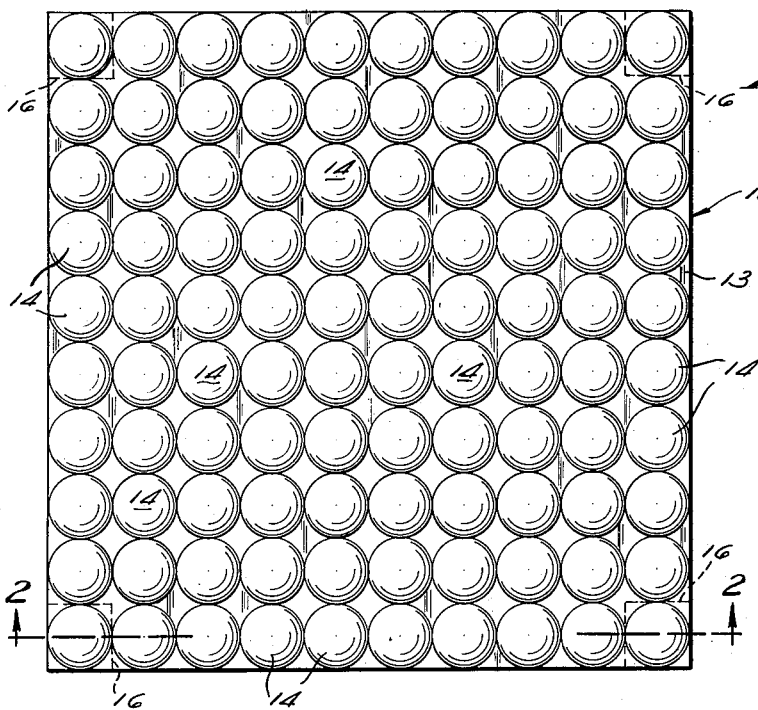
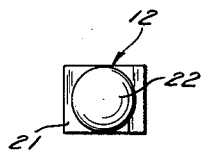
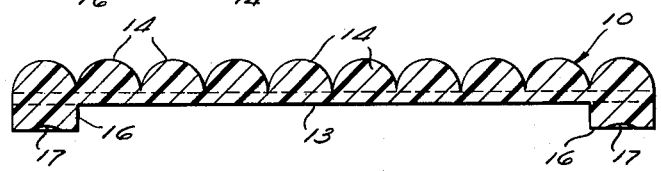
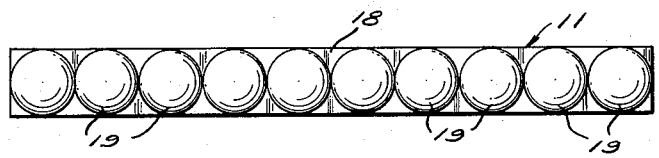
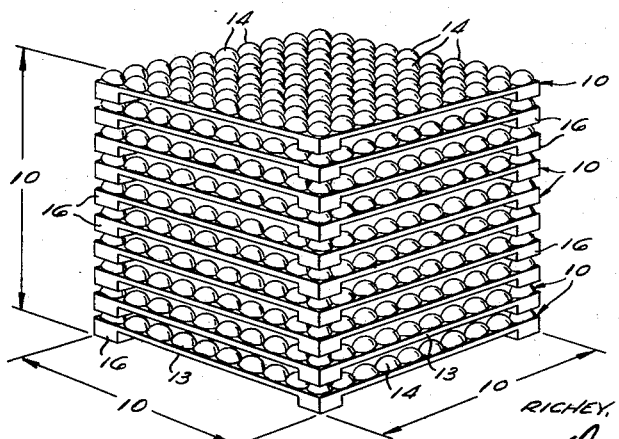
INVENTOR.
SOPHIE MARY WALCUK
BY
RICHEY, McNENNY & FARRINGTON
ATTORNEYS 3,125,814
EDUCATIONAL DEVICE
Sophie Mary Walcuk, 6804 Lansing Ave.,
Cleveland 5, Ohio
Filed Mar. 2, 1961, Ser. No. 92,999
1 Claim. (Cl. 35—32)

This invention relates generally to teaching aids and more particularly to an aid which assists a pupil in understanding the concept of numbers and of the basic arithmetic procedures.

Many children have difficulty in understanding the concept of numbers and their meanings, particularly in connection with the "place value" in numbers greater than 10 and greater than 100. Until an understanding of such place values is achieved, the concept of carrying and borrowing has little meaning to the pupil. The prior art devices such as stickmen, abaci and counting boards teach the child carrying or borrowing by taking one object from the ten's place and at the same time keeping in mind that the one object represents ten or a decade. Such devices, however, do not give a visual concept that the second place or digit to the left of the decimal point represents decade groupings and that the third place or digit to the left of the decimal point represents century groupings. Therefore, such devices fail to provide the pupil with a clear understanding of the meanings of each place or digit in a number and of the correct concept in borrowing and carrying used during adding and subtracting arithmetic operations.

A device incorporating this invention, however, includes three groups of elements. The first represents single units, the second represents decade units and the third represents century units. When properly used, a teaching aid according to this invention provides the pupil with visual and physical understanding of the meanings of the various places in numbers by enabling the children to manipulate elements in first, second and third positions. As a result, an understanding of the meaning of a number is developed and stays with the pupil as they read or write the number. Once the pupil sees the real connection between the number and quantities represented by numbers, they have a background for the understanding of the arithmetic procedures and their use.

It is an important object of this invention to provide a new and improved teaching aid which provides a pupil with a visual and physical stimulus to understand the meaning of numbers.

It is another important object of this invention to provide a teaching aid which gives the pupil both visual and physical stimulus to assist in the understanding of the meaning of the numbers 1 through 9 and an understanding of the concept of using the same figures over and over again along with a zero to write any number no matter how large.

It is another important object of this invention to provide a teaching aid useful in developing and understanding of the basic arithmetic operations such as carrying and borrowing by visually and physically demonstrating to the pupil the meaning of the place positions in a number and how they represent unit groupings, decade groupings and century groupings.

It is still another object of this invention to provide a new and improved teaching aid useful in the development of the concept of numbers and the arithmetic operations required in adding, subtracting and multiplication.

Further objects and advantages will appear from the following description of drawings wherein:

FIGURE 1 is a plan view of the century element according to this invention;

FIGURE 2 is a section taken through 2—2 of FIGURE 1;

FIGURE 3 is a plan view of the decade element;

FIGURE 4 is a plan view of the unit element; and

FIGURE 5 is a perspective view of a group of century elements stacked together to give a physical and visual concept of the meaning of numbers above 100.

A teaching aid kit incorporating this invention includes a plurality of century elements 10 representing groupings of one hundred, decade elements 11 representing groupings of ten and unit elements 12 representing single units. The century elements 10 are formed with a flat square base from the upper surface of which extends one hundred similar hemispheric projections 14 arranged in ten rows each containing ten projections. A depending leg 16 extends downwardly from the base 13 at each corner and is preferably formed with a recess 17 in its bottom face as illustrated in FIGURE 2. The recesses 17 are located in vertical alignment with the corner projections 14 so that the century elements can be stacked as illustrated in FIGURE 5. When this is done, the corner projections 14 of each element project into the recesses 17 of the element 10 resting thereon to provide stability in the stacked group and accurate vertical location of the successive elements 10. The legs 16 also provide sufficient spacing between successive century elements 10 so that the pupil can clearly see at least the peripheral row of projections 14. This insures that even though some of the century elements are substantially covered by the elements placed thereon, the pupil is still aware of the large number of projections on the lower century elements.

The decade elements 11 shown in FIGURE 3 are in the form of elongated strips having a rectangular base 18 and a single row of ten hemispheric projections 19 projecting from the upper surface thereof. The hemispheric projections 19 on the decade elements 11 are the same size as the hemispheric projections 14 on the century elements 10.

The unit elements 12 illustrated in FIGURE 4 are provided with a rectangular base 21 and a single hemispherical projection 22 projecting from its upper surface. Here again, the projection 22 on the unit elements 12 are identical in size with the projections 19 and 14 on the decade elements 11 and century elements 10 respectively.

The various elements 10, 11 and 12 are preferably molded from a plastic such as polyethylene, however, other suitable materials could be used. The advantage of molding the elements of plastics, of course, are low cost of manufacture, high speed manufacturing, durability and light weight.

Preferably, a kit incorporating a teaching aid according to this invention consists of forty unit elements 12, twenty decade elements 11 and ten century elements 10. In the use of the teaching aid, the elements are arranged in a box with the unit elements 11 on the right side, the decade elements 10 in the middle and the century elements on the left hand side. When manipulating the elements for any computation, the arrangement should be the same on the desk. By using this arrangement the pupil rapidly acquires a concept of the meaning of the place values of digits.

In the use of the teaching aid the pupil begins with a clear desk which represents zero. The first unit element 12 is then placed on the desk to represent one. A second unit element 12 is then placed beside the first to give the understanding that one plus one equals two. This is continued by adding one unit element 12 until a total of nine is reached. The unit elements are then used to represent combinations which show that natural numbers are accumulative, for example, three elements and two elements equals five elements and the reverse, two elements and three elements equals five elements. This may continue until presentation of all the combinations below ten are concretely and meaningfully developed. Subtraction combinations are discovered by covering up the unit elements to be subtracted. Children discover that through this operation that addition and subtraction are inverse of the other.

By using unit elements 12 and decade elements 11, the pupil learns to count above ten. The pupils are taught when they place ten unit elements in the first position that the "ALL" or "TEN" count is reached. "ALL" or "TEN" means a full count for the first position. The count "ALL" and "TEN" is used simultaneously and is emphasized here because "TEN" is the base of our ordinary counting. The meaning of decades and the counting up to ninety-nine is taught by using the unit elements of FIGURE 4 and the decade elements of FIGURE 3.

The pupils take unit elements 12 and place them one by one in the right or unit position until "TEN" or "ALL" is reached. Now the pupils are led to change the ten unit elements 12 to one decade element 11 and place it on the desk in the second position. The understanding of this exchange is aided by the fact that a decade element 11 has the same number of projections as ten unit elements 12. The unit elements are then replaced into the box and the children proceed by placing unit elements again in the first position counting at the same time 11—12, etc. until the count of "20" is reached. Again the pupil sees that 10 is the "ALL" count and are led to exchange one decade element 11 in the second or middle position for the ten unit elements 12 in the first or right position. This is continued until a count of one hundred is reached. In this way the pupil sees that "two alls and five ones" are two tens and five ones and are read as two tens and five ones or twenty-five. Thinking in groups of ten, it is a logical habit because our entire system is built on the base 10. For example, the children place seven unit elements 12 together with six unit elements 12 and discover that seven plus six equals thirteen and six plus seven equals thirteen. They also discover that thirteen can be ten plus three or three plus ten.

The century elements 10 represent the third position or the hundreds position. The meaning of numbers from one hundred to one thousand can be taught by the use of these elements. The pupil represents 396 by placing six unit elements in the right hand position, nine decade elements 11 in the middle position and three century elements in the left position. They see that 396 is three one hundreds, nine tens and six units or ones and this is read 396.

This kit is also capable of being used to furnish sums. To perform the addition of 24 and 17, the pupil represents 24 with two decade elements 11 and four unit elements 12. The number 17 is represented with one decade element 11 and seven unit elements 12. The pupil learns that seven and four can be grouped as one decade unit 11 and one unit element 12. Consequently, they easily see that they move the "TEN" over to the middle column and read the sum forty-one.

In a similar manner it is possible to illustrate the idea of borrowing a ten in the subtraction process. Real meaning of the term borrowing in subtraction is concretely developed through this new teaching aid to perform the subtraction of 345 minus 167, the 345 is shown by placing five unit elements 12 in the right position, four decade elements 11 in the middle position and three century elements 10 in the left position. The pupil then sees that seven cannot be taken from five so he needs more unit elements 12. He therefore exchanges one decade element 11 for ten unit elements 12 and puts them with the five unit elements. Now he has fifteen unit elements 12 in the right position and it is a simple matter to subtract seven unit elements 12 therefrom by placing seven of the unit elements 12 in the box. The middle position now contains three decade elements but here again, it is impossible to subtract six decade elements from three, therefore, the pupil is taught to exchange one of the century elements 10 for ten decade elements 11 so that thirteen decade elements 11 are provided in the middle position. From these six are subtracted by placing six decade elements 11 in the box leaving seven decade elements. The subtraction is completed by removing one century element from the two remaining leaving one. The answer is then read as 178.

Simple multiplication can also be taught with the use of a kit. As an example, three groups of three unit elements can be added to show that three times three equals nine.

Because each of the elements 10 and 11 are provided with the correct number of raised hemispherical projections, the pupil is able to comprehend by both sight and touch the quantities represented by numbers. Since each hemispheric projection on any of the elements represents one unit, the pupil is able to see that a two in the hundred's position signifies 200, while a two in the unit position signifies only 2. The same thing is true in the decade position. The use of the teaching aid incorporating this invention therefore gives the pupil a true comprehension of the meaning of the numbers as well as an understanding of the operations used in simple arithmetic.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

What is claimed is:

A visual aid for teaching the basic concepts of numbers and arithmetic procedures comprising a plurality of separate single unit elements each having a rectangular flat base and a single hemispheric integral projection extending from the upper face thereof, a plurality of elongated decade elements each having a rectangular flat base and ten hemispheric integral projections identical to said single hemispheric projection arranged in a row projecting from the upper face thereof, and a plurality of century elements each having a rectangular flat base and one-hundred hemispheric integral projections identical to said single hemispheric projection extending from the upper face thereof arranged in ten rows each containing ten projections, all of said projections being substantially the same size, a leg depending from each corner of the base of each century element, said century elements being adapted to be arranged in a vertical stack, each of said legs being formed to fit over the corresponding projection of the century element upon which it rests maintaining said stack of said century elements in vertical alignment.

References Cited in the file of this patent

UNITED STATES PATENTS

| | | |
|---|---|---|
| 1,305,724 | Kennedy | June 3, 1919 |
| 2,351,918 | Bennan | June 20, 1944 |

FOREIGN PATENTS

| | | |
|---|---|---|
| 6,616 | Great Britain | Dec. 31, 1904 |
| 22,073/29 | Australia | Aug. 7, 1930 |
| 888,774 | Germany | Sept. 3, 1953 |